US006433510B1

(12) United States Patent
Ribellino et al.

(10) Patent No.: US 6,433,510 B1
(45) Date of Patent: Aug. 13, 2002

(54) CONTROL CIRCUIT FOR THE CHARGING CURRENT OF BATTERIES AT THE END OF THE CHARGING PHASE, ESPECIALLY FOR LITHIUM BATTERIES

(75) Inventors: Calogero Ribellino, Gravina Di Catania; Patrizia Milazzo, Messina; Francesco Pulvirenti, Acireale, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/697,232

(22) Filed: Oct. 26, 2000

(30) Foreign Application Priority Data

Oct. 28, 1999 (IT) .......................... MI99A2250

(51) Int. Cl.[7] .................................................. H02J 7/00
(52) U.S. Cl. ...................................................... 320/128
(58) Field of Search ................................ 320/128, 136, 320/137, 148; 361/93; 327/540

(56) References Cited

U.S. PATENT DOCUMENTS

| 5,821,736 | A | * | 10/1998 | Yeon ........................... 320/148 |
| 5,847,912 | A | * | 12/1998 | Smith et al. .................. 361/93 |
| 6,002,293 | A | * | 12/1999 | Brokaw ....................... 327/540 |
| 6,100,667 | A | * | 8/2000 | Mercer et al. ............... 320/137 |
| 6,137,267 | A | * | 10/2000 | Kates et al. ................. 320/136 |

\* cited by examiner

*Primary Examiner*—Peter S. Wong
*Assistant Examiner*—Pia Tibbits
(74) *Attorney, Agent, or Firm*—Wolf, Greenfield & Sacks, P.C.; James H. Morris

(57) ABSTRACT

A control circuit for controlling current of batteries at the end of the charging phase, especially for lithium batteries, including an input/output circuit, placed between a battery charger and a battery, and an output stage, including two transistors, wherein the resistance of one of the two transistors is modulated to increase the value of the total resistance and to cause a lower turning off current of said output stage.

21 Claims, 5 Drawing Sheets

CONTROL CIRCUIT FOR THE CHARGING CURRENT OF BATTERIES AT THE END OF THE CHARGING PHASE, ESPECIALLY FOR LITHIUM BATTERIES

BACKGROUND OF THE INVENTION

1. Field of the Invention

The present invention relates to a control circuit for controlling the charging current at the end of the charge phase for batteries, especially for lithium batteries. The charging current at the end of the charging phase is called the charge end current.

2. Discussion of the Related Art

In the field of power management for mobile phones, there are circuits adapted for monitoring the main battery charge level and backup, during the standard working of the device and/or during the charge phase of the batteries. These circuits also have the essential task of managing the current consumption during the different operative modes of the device.

Usually the charge operation of a battery is performed by a constant value current source and is carried out according to the type of battery used in the particular device.

For example, in nickel-cadmium type (NiCd) or nickel-metal-hydrid type (NiMH) batteries, the technique used to end the charge phase consists usually in the monitoring of the time change of the charge voltage and/or of the battery temperature. In the case of lithium type (Li) batteries the battery charger used is a current limited voltage source.

The end phase of charging a lithium battery is defined by the simultaneous control of two parameters, the charge voltage level and the current flowing in the battery.

In order to charge the battery at its maximum capacity, it is necessary that the charge end current supplied by the charge circuit is always less than that supplied by the battery.

The input/output integrated circuits between the battery charger and the battery presently use a comparator that turns off the charge switch when the battery voltage is near the battery charger voltage and the input/output circuits include an output stage that can change its output resistance so as to reduce the current that flows from the battery charger to the battery.

This logic turns off at a charge end current greater than that which would provide for optimum charging. The lithium battery, therefore, is not charged to its maximum capacity.

Moreover, makers of mobile phones want to have integrated devices with lower output resistance to reduce power consumption and therefore to improve the power management of the available charge in the battery.

In view of the state of the art described, it is an object of the present invention to modulate the output resistance of the battery-charger and battery input/output so that it is possible to have a charge end current near zero.

SUMMARY OF THE INVENTION

According to the present invention, this and other objects are achieved by a control circuit for controlling the charge end current of batteries, especially for lithium batteries, comprising an input/output circuit, placed between a battery charger and a battery, comprising a transconductance operational amplifier and a control circuit, and an output stage, comprising two transistors, one of which is controlled by said control circuit, wherein the other transistor is controlled by said transconductance operational amplifier so as to increase the value of the total resistance of said output stage as a function of the voltage difference between the positive pole of said battery charger and the positive pole of said battery so to provide a smaller turning off current of said output stage.

As a result of the present invention it is possible to make a device by means of which the current that can flow in the battery during the end of the charging phase does not have a minimum lower threshold but it can tend to or be made zero.

Moreover such circuit solution is flexible and it is applicable also to future generations of lithium batteries because the charge end current will be smaller and smaller and, finally, it does not involve threshold choices and therefore it is a robust solution from the point of view of the technology.

BRIEF DESCRIPTION OF THE DRAWINGS

The features and the advantages of the present invention will be made evident by the following detailed description of an embodiment thereof which is illustrated as not limiting example in the annexed drawings, wherein.

DETAILED DESCRIPTION

Figure 1:
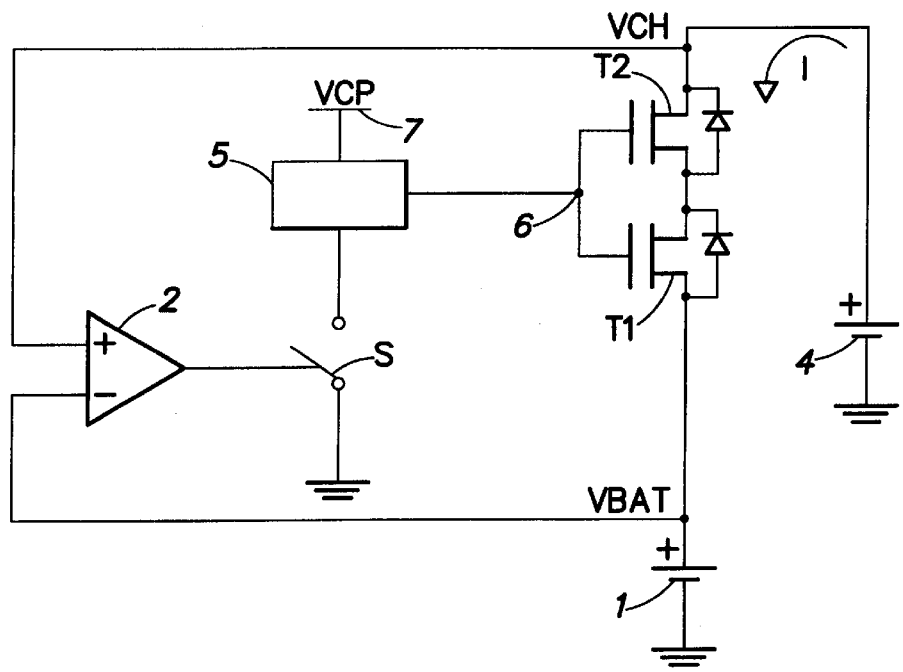
FIG. 1 shows an input-output circuit between a battery charger and a battery according to the prior art.

In FIG. 1 an input-output circuit between battery charger and battery according the prior art is shown.

As shown in the Figure a battery 1, the positive pole of which, called VBAT, is common with the inverting input of a comparator 2 and with the drain terminal of a transistor T1, while the negative pole of said battery is connected to the ground. The comparator 2 has the non inverting input in common with the positive pole, called VCH, of a battery charger 4 and the output is connected by a switch S to a driver device 5, called "driver". The transistor T1 has the source terminal connected with the source terminal of a second transistor T2 and both transistors T1 and T2 have in common the gate terminal 6. The configuration adopted by the transistors T1 and T2 is known as back to back configuration.

The gate terminal 6 is the driver output 5 and this is connected directly to a biasing voltage 7 called VCP.

Figure 2:
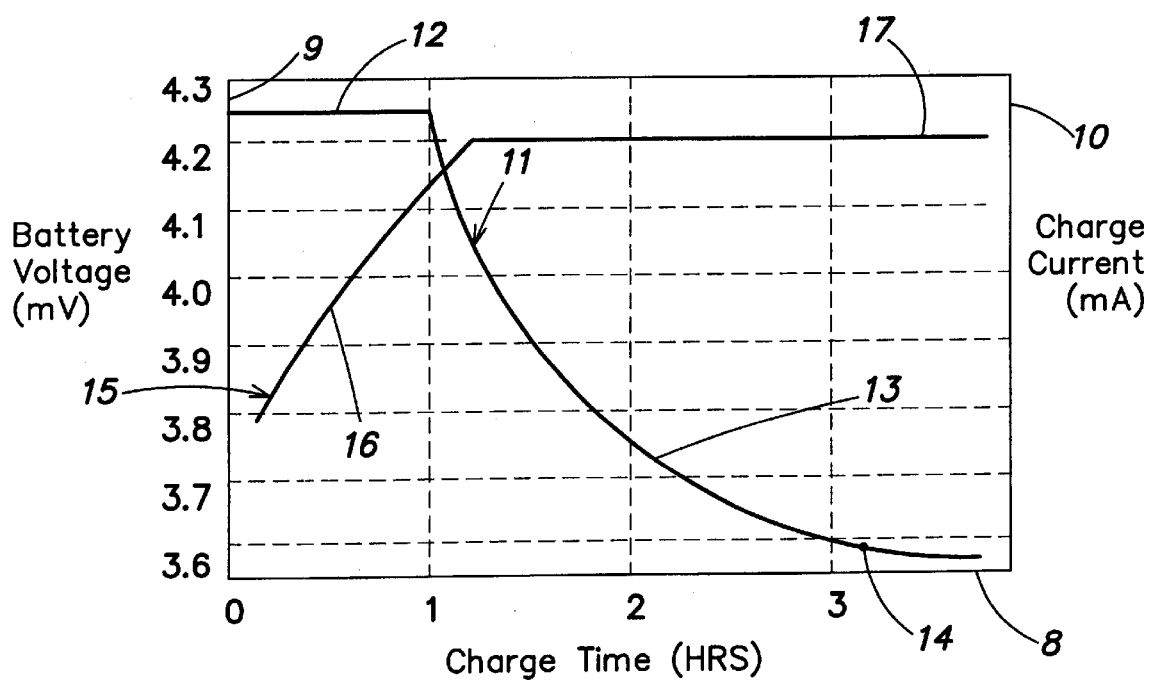
FIG. 2 shows a graph of the battery voltage and of the charge current in function of the charge time referring to the circuit of FIG. 1.

When the battery 1 is discharged, the battery charger 4 provides the maximum current I, charging said battery 1 with a constant current as illustrated successively in the graphs of FIG. 2. When the voltage difference of the battery 1 is near the battery charger voltage 4, the current I decreases because its value is determined by the difference between the voltage of the battery charger and the battery and the resistance introduced by the back to back configuration of the transistors T1 and T2, called Rbb, that is: I=(VCH−VBAT)/Rbb.

Therefore the back-to-back configuration of the two transistors T1 and T2 serves to prevent current passage I from the battery 1 to the battery charger 4 when the latter shows a voltage difference lower than that on the battery 1.

Figure 3:
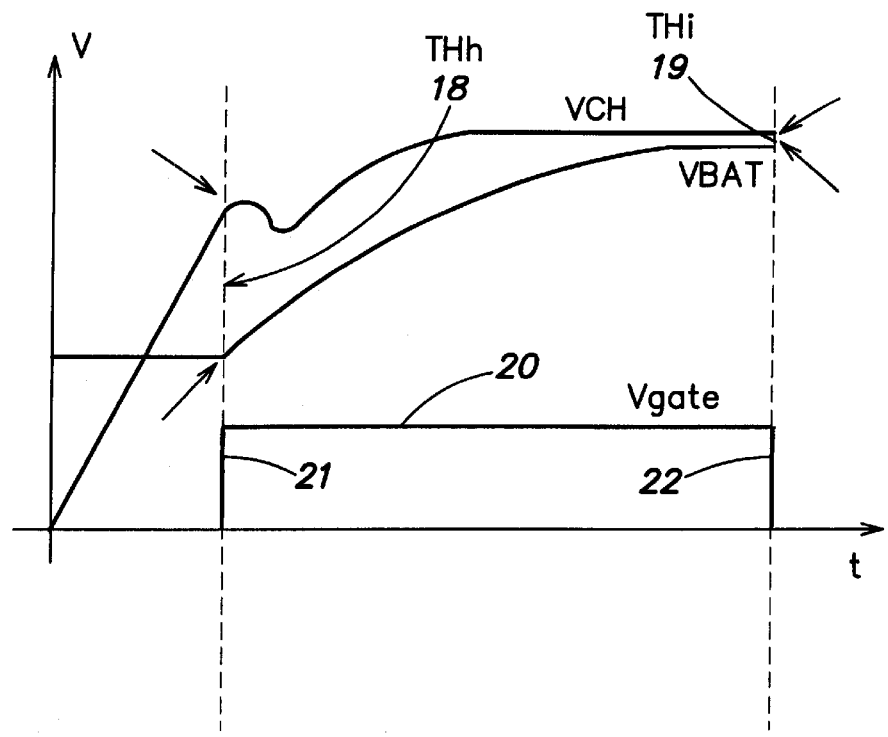
FIG. 3 shows the behavior of charger, battery and gate voltages (node 6) of the input-output circuit of FIG. 1.
Figure 4:
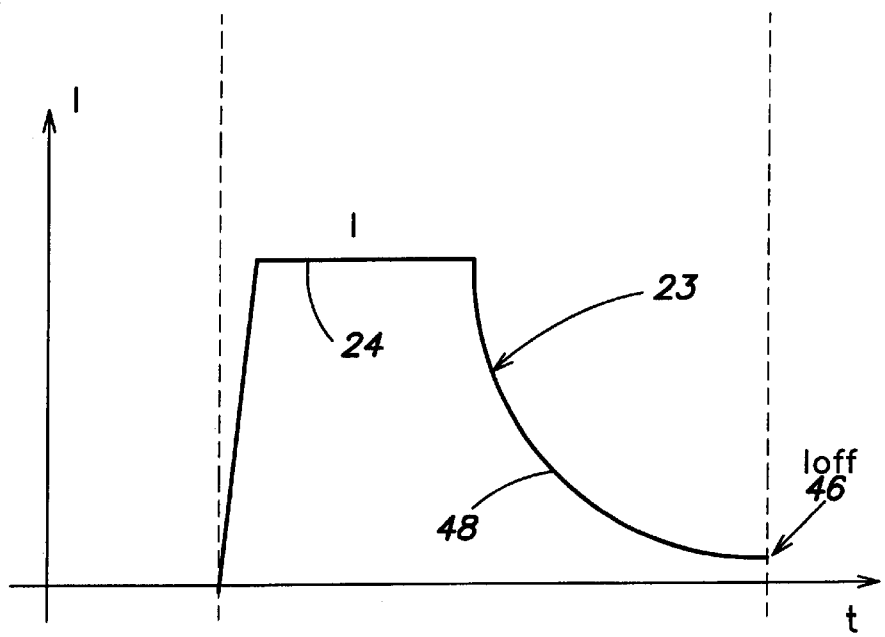
FIG. 4 shows the behavior of charging current of the input-output circuit of FIG. 1.

The comparator 2 serves to engage the back to back configuration only when the charge battery 4 shows a voltage difference higher than the battery 1, as shown successively in the graphs of FIG. 3 and 4.

To end the charge phase of the battery 1, the voltage of the battery and the flowing current in the same are simultaneously checked and the charge phase is ended when the voltage of the battery has reached the charge end value and the current is below a current predefined value, as shown successively in the graphs of FIG. 2.

In FIG. 2 a graph of the battery voltage and of the charge current as a function of the charging time according to the prior art, is shown.

FIG. 2 shows an axis of abscissa 8 describing the charge time expressed in hours, and two ordinate axes 9 and 10, describing respectively the battery voltage in milliVolt and the charge current of the battery in milliAmpere.

As deduced from the graph, the curve 11, describing the charge current trend, has a horizontal line 12, that is the current value I is constant, and this refers to the case in which the battery 1 is discharged and the battery charger 4 provides the maximum current, curve 11 also has a decreasing exponential trend 13, and this is referred to the case wherein the battery voltage level 1 is near the battery charger voltage 4.

The point 14, called Imin, placed in the end part of said line 13 is the moment during which the charge phase is ended, that is when the voltage battery 1 has reached the charge end value and the current is below a current predefined value.

The curve 15, describing the charge voltage trend, develops in a complementary manner with respect to the charge current curve 11; therefore there is an increasing exponential trend in the first segment 16, when, i.e., the battery 1 is discharged and the battery charger 4 provides the maximum current, and a second segment with a constant voltage 17, when, i.e., the voltage level of battery 1 is near the voltage of battery charger 4.

In FIG. 3 and 4 the operation of the input-output circuit of FIG. 1 as a function of the voltage and current variables, is shown.

FIG. 3 shows an axis of abscissa describing the time and an ordinate axis describing the voltage, while in FIG. 4 shows an axis of abscissa describing the time and an ordinate axis describing the current.

The comparator 2, shown in FIG. 1, serves, as previously described, to turn on the back to back output configuration only when the battery charger 4 shows a voltage VCH higher than the battery voltage VBAT 1. As is deduced from FIGS. 3 and 4, the comparator 2 has two thresholds: the first one 18, called THh, allows turning on the transistors only when the battery charger VCH 4 is greater than the sum of the battery voltage VBAT 1 and the threshold value 18, that is when we have: VCH>VBAT+THh; the second one 19, called TH1, allows turning off the transistors only when the battery charger VCH 4 is smaller than the sum of the voltage VBAT and the threshold value 19, that is when we have: VCH<VBAT+TH1.

FIG. 3 also shows a signal of rectangular shape 20 adapted for the succession operations, by means of the rising edge 21, and turning off, by means of the falling edge 22, of the back-to-back configuration of the transistors T1 and T2.

In FIG. 4, a trend 23 of the current I during the change of the accumulated charge in the battery 1 is shown. Until the battery 1 is discharged, the charge battery 4 provides the maximum current charging said battery 1 with a constant current, line 24, while when the voltage level VBAT is near the voltage VCH, the current I reduces itself according to a decreasing exponential, line 25, reaching a point 26, called Ioff, wherein the back to back configuration is turned off.

Therefore, if the configuration made by the two transistors T1 and T2 of the device shown in FIG. 1 is turned off when the flowing current I is higher than the current value Imin, point 14 of FIG. 2, the battery 1 is not charged to its maximum capacity.

The prior art devices already on market choose the threshold TH1 19 very low and in this way, the turning off current, as previously described, is: Ioff=(VCH−VBAT)/Rbb=TH1/Rbb, where Rbb is the total resistance of the two transistors T1 and T2 arranged in the back-to-back configuration.

The new generations of lithium batteries foresee a current Imin very low, at or approaching a limit of zero.

The threshold TH1 for the comparators of type 2 is presently placed equal to 5 mV and the resistance Rbb is placed equal to 200 mOhm; therefore providing a current Ioff equal to 25 mA, much higher that the minimum levels of the new generations of lithium batteries (about 10 mA).

The drawback of the prior art is in the difficulty of making a comparator 2, the threshold TH1 of which is at limit zero and very precise. In fact every offset in the comparator structure, caused by process imperfections or by lithographic problems, can result in very high threshold value precision errors.

Figure 5:
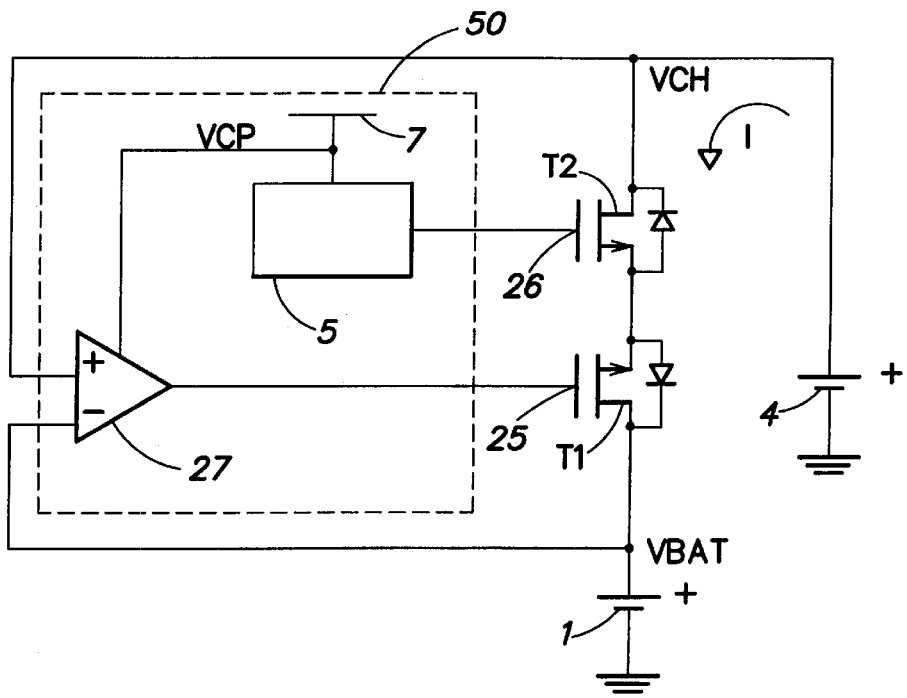
FIG. 5 shows an input-output circuit between battery charger and battery according to the invention.

In FIG. 5 an input-output circuit between battery charger and battery according to the invention is shown.

FIG. 5 shows a circuit in which, to modulate the resistance of one of the two transistors T1 and T2 so as to increase the output total resistance value Rbb when the battery 1 is under a charge phase, the driving of the gate terminals of T1 and T2 is divided. As shown in FIG. 5, the transistor T2 has its drain terminal still connected to the positive pole of the battery charger 4 while the gate terminal is controlled by the driver device 5. Transistor T1 has its drain terminal connected to the positive pole of the battery 1 while its gate terminal is controlled by a transconductance operational amplifier 27, at the input of which there is the voltage difference between the voltage of battery charger 4 and that of battery 1.

We note also that the driver device 5 and the operational amplifier 27 are connected with the same supply line 7 and all together form the input/output circuit 50 between the battery charger 4 and the battery 1.

Figure 6:
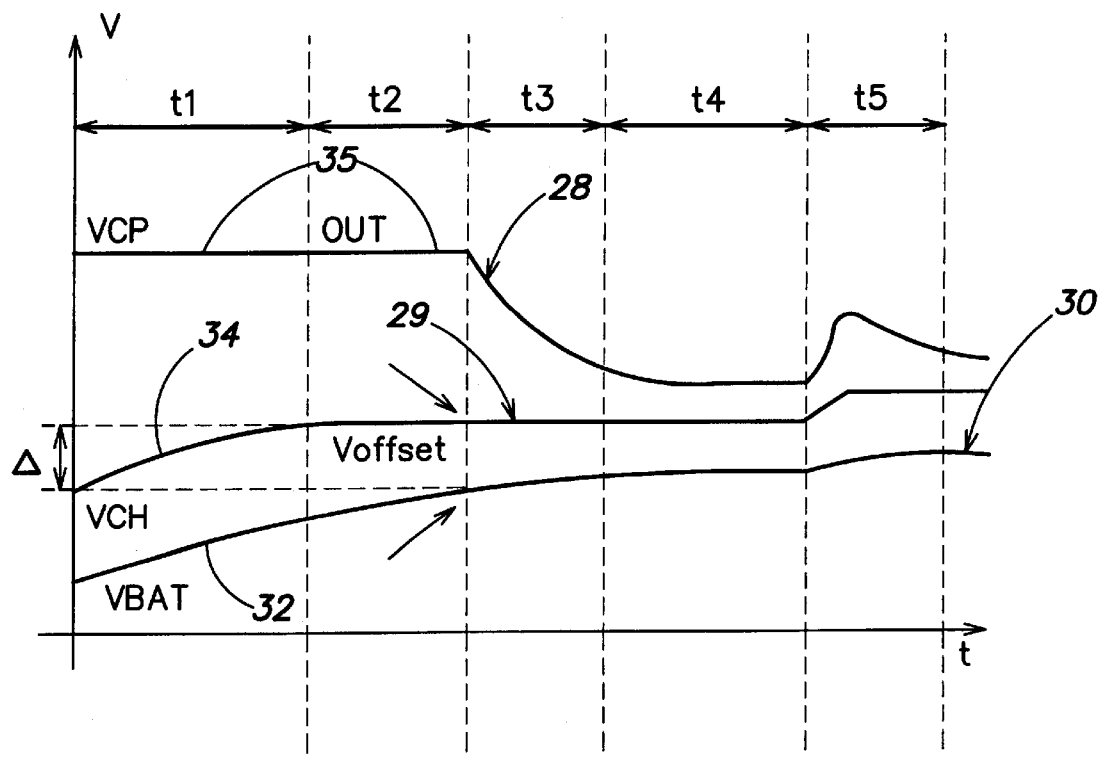
FIG. 6 shows the behavior of charger, battery and gate voltages (node 25) of the input-output circuit of FIG. 5.
Figure 7:
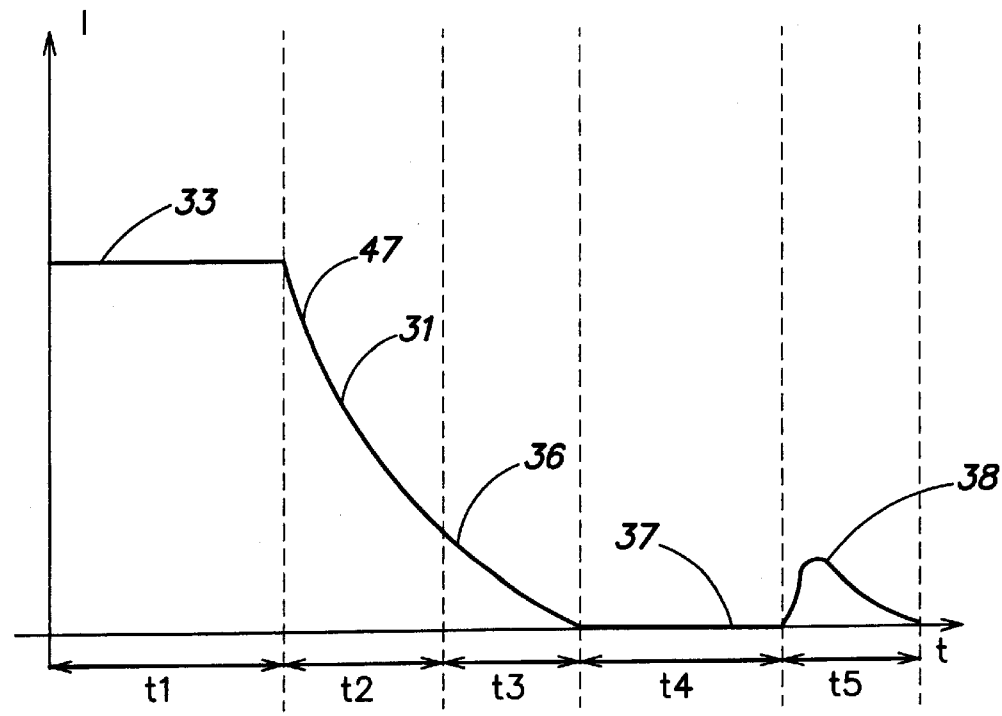
FIG. 7 shows the behavior of charging current of the input-output circuit of FIG. 5.

In FIG. 6 and 7 the operation of the input-output circuit of FIG. 5 with respect to the variable voltage and to the variable current is shown.

FIGS. 6 and 7 show abscissa axes describing the time and an ordinate axis describing the variable voltage in FIG. 6 and the variable current in FIG. 7.

In FIG. 6, the line 28 represents the voltage on node 25, line 29 represents the battery charger 4 voltage VCH, line 30 represents the battery voltage 1 VBAT. In FIG. 7 the curve 31 represents the trend of the current I in the transistors T1 and T2.

FIGS. 6 and 7 illustrate, during the first phase, called t1, the battery 1 is charging (segment 32) with the maximum current (segment 33) provided by the battery charger 4 (segment 34). During the phase t2 the flowing current I in the battery 1 (segment 34) is defined by the ratio between the voltage difference of the battery charger 4 and the battery 1 and the maximum value of the total resistance Rbb of the two transistors T1 and T2, that is: (VCH−VBAT)/Rbb. During both phases t1 and t2, the gates of the transistors T1 and T2 are controlled with the maximum overdrive, segment 35 of the line 28, so to optimize the total resistance Rbb.

During the phase t1 when the battery voltage VBAT reaches the voltage difference between the VCH 4 and the offset voltage, Voffset i.e. when VBAT reaches the voltage Δ=VCH−Voffset, the operational amplifier 27 starts to check the gate electrode voltage of the transistor T1. In this way since the transistor T1 is no longer controlled by the maximum voltage VCP, the transistor increases its resistance causing an increment of the total resistance between the positive pole of the battery charger 4 and the positive pole of the battery 1, that is between the circuit nodes connected to a voltage VCH and VBAT. This causes a reduction of the current I, shown in segment 36 of the curve 31, that can flow in the battery I until it dissolves gradually as a function of the voltage difference between VCH and VBAT.

In this way, unlike what is described in the circuit in FIG. 1, during the phase t4 the transistor T2 remains always in conduction region. The gate electrode 25 is not discharged to ground but is controlled by the operational amplifier 27, so that, when the equilibrium value Δ=VCH−VBAT is reached, the transistor T1 no longer conducts current, as illustrated by segment 37 of the curve 31.

During the phase t5 it is sufficient to increase, even only a few millivolt, the voltage on the terminal of the battery charger 4 so that the transistor T1 starts again to conduct, as seen in segment 38 of the curve 31.

The operational amplifier 27 should be designed to start to work when the device is in the charge end phase, phase t3. Unlike the circuit described in FIG. 1 the solution described in the FIG. 5 is more flexible because the only parameter to be scaled is the offset voltage Voffset which determines the start of the intervention of the operational amplifier 27.

For the operational amplifier 27 to be suitable to the objects its gain should be low when the voltage difference between the battery charger 4 and the battery voltage 1 is positive, that is when VCH−VBAT>0, so that the transistor T1 turns off gradually. Moreover, the gain of said amplifier should be suitable to guarantee the turning off transistor T1 when the voltage difference of the voltage of the battery charger 4 and the voltage battery 1 is negative, that is when VCH−VBAT<0. In fact in the latter case the gate 25 of the transistor T1 must be discharged to ground so as to avoid the current passing from the positive pole of the battery 1 to the battery charger 4 through the transistor T1.

Figure 8:
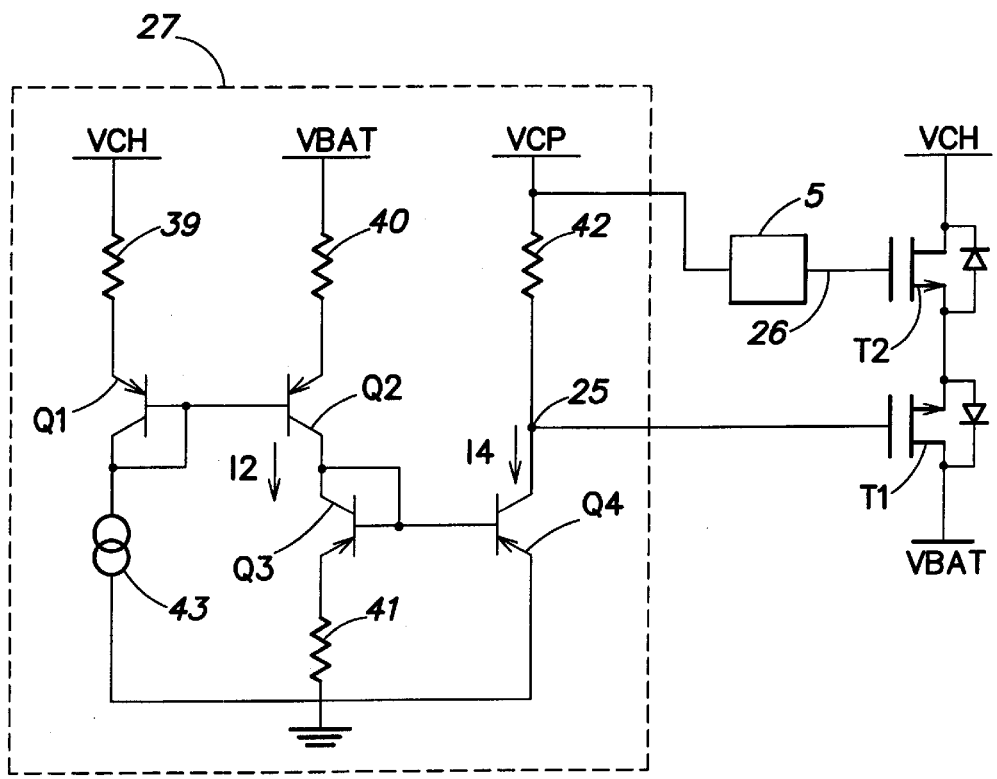
FIG. 8 shows an embodiment of a device of FIG. 5, especially of an operational amplifier.

In FIG. 8 an alternative embodiment of a device of FIG. 5 particularly with the operational amplifier, is shown.

As shown in such FIG. 8, 27 is a possible embodiment of the operational amplifier shown in FIG. 5. We note the existence of a first mirror circuit configuration made by the transistors Q1 and Q2 and a second mirror configuration called Widlar made by the transistors Q3, Q4.

A resistance 39 is placed between the positive pole voltage of the battery charger 4, called VCH, and the emitter electrode of said transistor Q1, and said transistor Q1 is connected with a reference current source 43 called Iref., while a resistance 40 is placed between the positive pole voltage of the battery, called VBAT, and the emitter electrode of the transistor Q2. A resistance 41 is placed between ground and transistor emitter Q3 and a resistance 42 is placed between the two gate electrodes 25 of the transistor T1 and the supply VCP.

It should be noted that the gate electrode 26 of the transistor T2 is controlled by the driver circuit 5 that is directly connected to the supply line VCP.

If the two resistors 39 and 40 are equal in value, and if the battery voltage 1 is much lower than the battery charger voltage 4, that is VBAT<VCH, then the transistor Q2 is in interdiction region and therefore the gate voltage 25 of the transistor T1 is equal to the voltage VCP. As soon as the battery voltage charges itself, that is the value VBAT is near the value VCH, the transistor Q2 starts to conduce and the current I2 is amplified by the two transistors Q3 and Q4 and by the resistance 41 giving rise to the current I4.

During this phase the gate voltage 25 starts to decrease modulating in this way the transistor channel resistance T1. The circuit will reach such a voltage value that the voltage difference between VCH and VBAT will conduct the transistor T1 into the interdiction region. In this case, if the voltage VCH increases by a few millivolts, the current I4 decreases because of the reduction of the current I2, to such a quantity that the voltage on the gate 25 carries the transistor T1 into the conduction region.

The current I4 must be sufficiently high to take the gate voltage 25 to ground in the situation wherein VCH is less than VBAT.

The relationship that links the current I4 to the current I2 is the following:

I4=I2 * exp where Vt is the thermal equivalent voltage of the transistors Q3 and Q4. This relationship demonstrates an exponential dependence between the current I4 and I2. As a result, a small current increment in I2 causes the current I4 to increase considerably.

If we choose different values for resistors 39 and 40, particularly 39>40, it is possible to cause an offset voltage value Δ for the operational amplifier 27 in order to fix the voltage range VCH−VBAT wherein there is modulation of the transistor resistance T1. Until the voltage difference between VCH−VBAT is greater than Voffset, the current I4 must be so little so as not to discharge the transistor gate capacity T1. The circuit 27 should be scaled so that, when VCH−VBAT=Voffset, the current I2 will be equal to the reference current Iref and the current I4 will start to discharge the transistor gate capacity T1.

The offset voltage Voffset is deduced by the following relationship:

Voffset=VCH−VBAT=I * (R39−R40).

Figure 9:
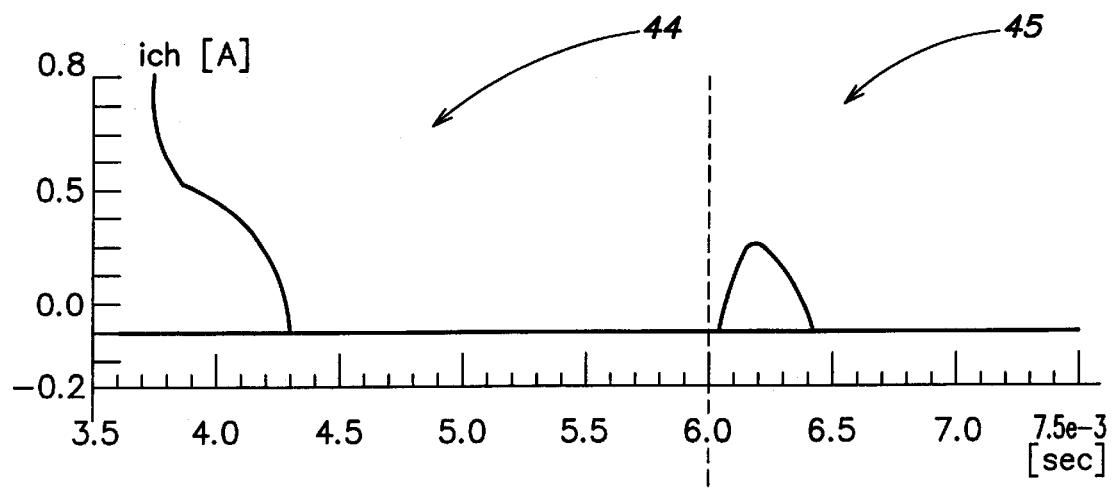
FIG. 9 shows a time-current graph, deduced by an electrical simulation of the circuit according to the present invention.
Figure 10:
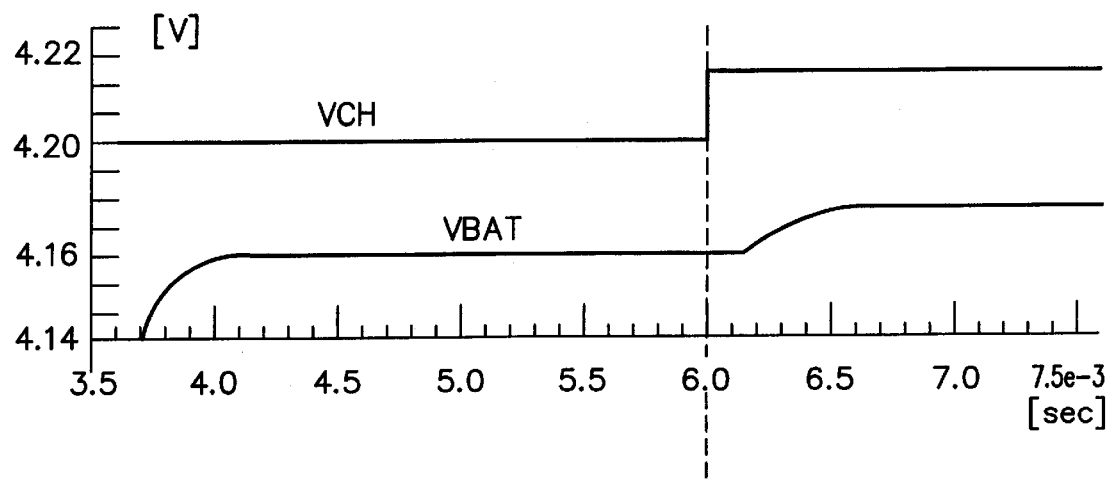
FIG. 10 shows a time-voltage graph, deduced by an electrical simulation of the circuit according to the present invention.
Figure 11:
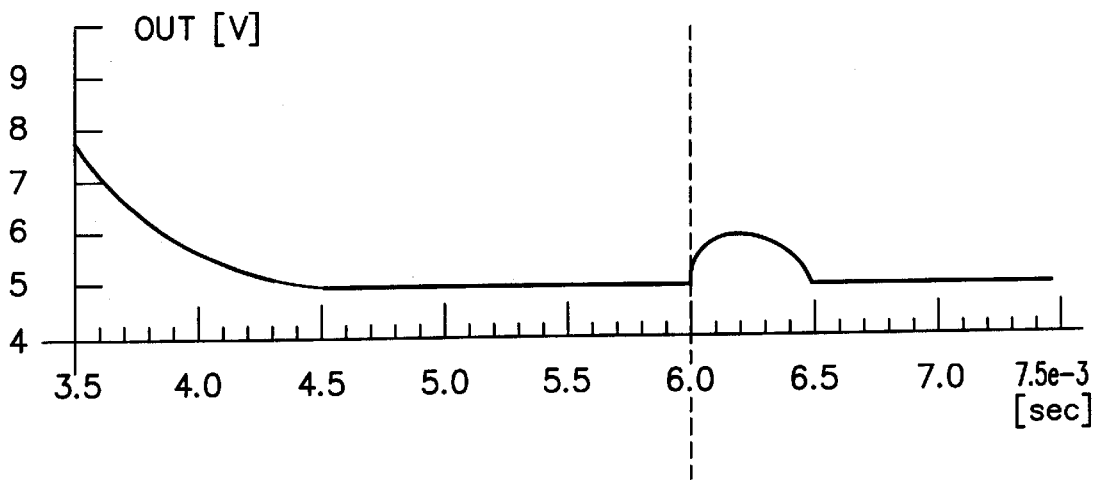
FIG. 11 shows another time-voltage graph, deduced by an electrical simulation of the circuit according to the present invention.

In FIGS. 9, 10 and 11 a time-current graph of I, a time-voltage graph of VCH and VBAT and a time-voltage graph of the T1 gate V, respectively, as deduced by an electrical simulation of the circuit according to the present invention, are shown.

The Figures are subdivided in two phases, wherein the first phase, called 44, describes the standard operation while the second phase, called 45, describes an increment of about 10 mV of the voltage of battery charger 4.

During the phase 44 in FIG. 9 we note that the slope change of the current I is due to the fact that the resistance of the transistor T2 starts to be modulated by the voltage on the gate 25 on the transistor T1 shown in FIG. 11.

In the phase 45 of the electrical simulation we can note how increasing the voltage VCH of the battery charger 4, the current I, shown in FIG. 9, starts again to flow and the battery 1 starts again to charge.

With such an embodiment it is possible to reach an extremely precise battery charge value by changing the voltage VCH and without limiting the minimum current that can flow in the battery.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A control circuit for controlling a charge current of batteries, comprising an input/output circuit disposed between a pole of a battery charger and a pole of a battery, the I/O circuit comprising a transconductance operational amplifier having a first input coupled to the pole of the battery and a second input coupled to the pole of the battery charger, a driver circuit, and an output stage comprising a first transistor having a first electrode connected to the pole of the battery and having a second electrode connected to a second electrode of a second transistor, the second transistor also having a first electrode connected to the pole of the battery charger, wherein the second transistor is controlled by the driver circuit and the first transistor is controlled by the transconductance operational amplifier so to increase a value of a total resistance of the output stage as a function of a voltage difference between the pole of the battery charger and the pole of the battery.

2. The control circuit for controlling the charge current of batteries according to claim 1, wherein the transconductance operational amplifier controls the first transistor such that the total resistance increases as the voltage difference between the pole of the battery charger and the pole of the battery decreases.

3. The control circuit for controlling the charge current of batteries according to claim 1, wherein the first transistor has a control electrode connected to an output of the operational amplifier, and wherein the second transistor has a control electrode connected to an output of the control circuit.

4. The control circuit for controlling the charge current of batteries according to claim 3, wherein the first transistor and the second transistor are n-channel type MOSFET transistors.

5. The control circuit for controlling the charge current of batteries according to claim 3, wherein the transconductance operational amplifier comprises a third transistor that has a collector electrode connected to a base electrode and that forms a current mirror with a fourth transistor, the third transistor having an emitter electrode connected by a first resistive device to the positive pole of the battery charger and the collector electrode connected by a reference current generator to a reference potential, the fourth transistor having an emitter electrode connected by a second resistive device to the pole of the battery, the transconductance operational amplifier further comprising a fifth transistor and a sixth transistor that are connected so as to form a current mirror, wherein the sixth transistor has a collector coupled to the control electrode of the first transistor and is coupled by a third resistive device to a voltage supply line.

6. The control circuit for controlling the charge current of batteries according to claim 5, wherein the third transistor and the fourth transistor are pnp type bipolar transistors.

7. The control circuit for controlling the charge current of batteries according to claim 5, wherein the fifth transistor and the sixth transistor are pnp type bipolar transistors.

8. The control circuit for controlling the charge current of batteries according to claim 1, wherein the transconductance operational amplifier is configured to have a low amplifier gain when a voltage of the battery charger is greater than a voltage of the battery and to also have gain that is sufficient to turn off the second transistor when the voltage of the battery charger is substantially the same as or less than the voltage of the battery.

9. A Control circuit for controlling a charge current to a battery, comprising:

a battery charger having a first terminal;

a battery having a first terminal;

a series configuration of switching devices having a first terminal connected to the first terminal of the battery charger, a second terminal connected to the first terminal of the battery, and first and second control terminals; and an input/output circuit having a first control terminal coupled to the first terminal of the battery charger that provides a first voltage signal and a second control terminal coupled to the first terminal of the battery that provides a second voltage signal, the input/output circuit having a first output coupled to the first control terminal of the series configuration of switching devices, wherein the input/output circuit provides a third voltage signal to the first control terminal of the switching devices as a function of a voltage difference between the first voltage signal and the second voltage signal.

10. The control circuit for controlling the charge current according to claim 9, wherein the input/output circuit is configured to provide the third voltage signal that is linearly proportional to the voltage difference between the first voltage signal and second voltage signal.

11. The control circuit for controlling the charge current according to claim 9, wherein the series configuration of switching devices comprises:

a first transistor having a first terminal connected to the first terminal of the battery charger, a control terminal connected to the second output terminal of the input/output circuit and a second terminal connected to a first terminal of a second transistor; and the second transistor having a second terminal connected to the first terminal of the battery and a control terminal connected to the first output terminal of the input/output circuit.

12. The control circuit for controlling the charge current according to claim 11, wherein the first transistor and the second transistor are n-channel type D-MOSFET transistors.

13. The control circuit for controlling the charge current according to claim 9, wherein the input/output circuit further comprises an operational amplifier having a first input connected to the first terminal of the battery charger, a second input connected to the first terminal of the battery, a supply terminal connected to a supply voltage, and an output coupled to the first control terminal of the series configuration of switching devices.

14. The control circuit for controlling the charge current according to claim 13, wherein the first input of the operational amplifier receives the first voltage signal and the second input of the operational amplifier receives the second voltage signal, and the operational amplifier provides the third voltage signal to the first control terminal of the series configuration of switching devices.

15. The control circuit for controlling the charge current according to claim 14, wherein the input/output circuit further comprises a driver circuit having a first terminal connected to a supply voltage and a second terminal connected to the second control terminal of the series configuration of switching devices, and wherein the driving circuit provides a fourth voltage signal to the second control terminal of the series configuration of switching devices.

16. The control circuit for controlling the charge current according to claim 14, wherein the operational amplifier has a low amplifier gain when the first voltage signal is greater than the second voltage signal and the operational amplifier has a high amplifier gain when the second voltage signal is greater than the first voltage signal.

17. The control circuit for controlling the charge current according to claim 14, wherein the operational amplifier comprises:
   a first mirror configuration of active devices having a first terminal coupled to the first terminal of the battery charger by a first resistive device, having a second terminal coupled to the first terminal of the battery by a second resistive device, and having a third terminal coupled to a reference potential by a current source and having a fourth terminal; and
   a second mirror configuration of active devices having a first terminal connected to the fourth terminal of the first mirror configuration, a second terminal connected to the first control terminal of the series configuration of switching devices and coupled to the first terminal of the voltage supply by a third resistive device, having a third terminal coupled to the reference potential by a fourth resistive device, and having a fourth terminal connected to the reference potential;
   wherein the first mirror configuration provides a first current value that is a function of the first and second voltage value, the second mirror configuration provides a second current value that is a function of the first current value, that is converted to the third voltage value by the third resistive device.

18. The control circuit for controlling charge end current according to claim 17, wherein the first mirror configuration comprises:
   a third transistor having a collector terminal that is the third terminal and that is connected to a base terminal, and an emitter terminal that is the first terminal, and wherein the base terminal is connected to a base terminal of a fourth transistor; and
   the fourth transistor having an emitter terminal that is the second terminal of the first mirror configuration, and a collector terminal that is the fourth terminal of the first mirror configuration.

19. The control circuit for controlling charge current according to claim 18, wherein the third transistor and the fourth transistor are pnp type bipolar transistors.

20. The control circuit for controlling charge current according to claim 17, wherein the second mirror configuration comprises:
   a fifth transistor having a collector terminal that is the first terminal of the second mirror configuration and that is connected to a base terminal, and an emitter terminal that is the third terminal of the second mirror configuration and is connected to the fourth resistive device, and wherein the base terminal is connected to a base terminal of a sixth transistor;
   the sixth transistor having an emitter terminal that is the fourth terminal of the second mirror configuration and that is connected to the reference potential, and a collector terminal that is the second terminal of the second mirror configuration and that is connected to the third resistive device.

21. The control circuit for controlling charge current according to claim 20, wherein the fifth transistor and the sixth transistor are pnp type bipolar transistors.

* * * * *